US 6,560,099 B1

(12) United States Patent
Chang

(10) Patent No.: US 6,560,099 B1
(45) Date of Patent: May 6, 2003

(54) DOUBLE INTERFACE EXTERNAL BOX FOR A COMPUTER

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 0 days.

(21) Appl. No.: 10/218,383

(22) Filed: Aug. 14, 2002

(30) Foreign Application Priority Data

Jul. 10, 2002 (TW) ..................................... 91210477 U

(51) Int. Cl.[7] .............................................. G06F 1/16
(52) U.S. Cl. ................................... 361/685; 439/928.1
(58) Field of Search ................................ 361/685, 687, 361/724–727, 694–695, 752, 684, 686, 728–731, 735, 736; 211/41.17, 26.2; 312/223.1, 223.2; 439/928.1, 170

(56) References Cited

U.S. PATENT DOCUMENTS

| | | | | |
|---|---|---|---|---|
| 4,908,715 A | * | 3/1990 | Krum et al. | 361/685 |
| 4,941,841 A | * | 7/1990 | Darden et al. | 361/685 |
| 5,507,650 A | * | 4/1996 | Larabell | 361/685 |
| 5,515,515 A | * | 5/1996 | Kennedy et al. | 361/685 |
| 5,519,572 A | * | 5/1996 | Luo | 361/685 |
| 5,654,874 A | * | 8/1997 | Suzuki | 361/685 |
| 5,689,401 A | * | 11/1997 | Shikano | 361/685 |
| 5,721,669 A | * | 2/1998 | Becker et al. | 361/685 |
| 5,731,951 A | * | 3/1998 | Michaud et al. | 361/685 |
| RE35,915 E | * | 10/1998 | Hastings et al. | 361/685 |
| 5,911,589 A | * | 6/1999 | Chen | 361/685 |
| 6,222,727 B1 | * | 4/2001 | Wu | 361/685 |
| 6,231,145 B1 | * | 5/2001 | Liu | 361/685 |

* cited by examiner

Primary Examiner—David Martin
Assistant Examiner—Phuong T. Vu
(74) Attorney, Agent, or Firm—Law Offices of John Chupa and Associates, P.C.

(57) ABSTRACT

A double interface external box for a computer includes an upper and a lower lid and a control panel. The upper and a lower lid are oppositely joined to each other and form an external box with a storage device being received and fixed therein. The control panel has a transition circuit board with an outer side thereof being provided with component parts including a first connector with IDE interface, a second connector with USB interface, a cut over switch and a power input end to connect with the transition circuit board by way of a circuit respectively such that signals of the component parts can be transmitted and with an inner side thereof forming a third connector with IDE interface, a fourth connector with USB interface and a power output joint. A ribbon wire and/or a USB signal wire can be utilized to connect with an IDE interface connector of the storage device and the third connector and/or a USB interface connector and the fourth connector respectively, a power input socket of the storage device being inserted with the power output joint and the cut cover switch is operated to perform the interface cut over such that the first connector or the second connector can be connected to a connecting port of the computer selectively to enable transmission of signal.

12 Claims, 5 Drawing Sheets

DOUBLE INTERFACE EXTERNAL BOX FOR A COMPUTER

BACKGROUND OF THE INVENTION

1. Field of the Invention

The present invention relates to a double interface external box for a computer and particularly to a computer external box with both an IDE interface and a USB interface.

2. Description of Related Art

Due to the computer is getting more wide application in areas such as communication, multimedia and etc., the conventional personal computer and notebook computer are not possible to be expanded more spaces so that it is hard for the conventional computers to mount with so many computer peripheries. Taking 5.25 inch compact disk apparatus as an example, the only way can be done is the 5.25 inch compact disk apparatus is received and fixed in an external box with a signal wire connecting with the computer for the computer being able to perform operations of read and write in case of the personal computer being insufficient in space for mounting the compact disk apparatus. The preceding storage device (the compact disk apparatus) is signally connected to the computer with an IDE interface so that mostly the interface of the external box or the mobile rack is IDE interface.

However, it is known that the functions of hot swapping and plug and play are not available under IDE interface system. If the IDE interface storage device such as the hard disk is needed to replace, the power source has to be turned off before the storage device can be replaced and then the computer has to be reset before the new IDE interface working so that it is time consuming.

The IDE interface signal can be converted to USB, PCMCIA or IEEE 1394 (I-Link) signal according to the application of ASIC, (specific purpose integrated circuit). Hence, the storage device (the compact disk apparatus or the hard disk) has a built-in ASIC with a second interface connector such as a USB interface connector in addition to the first connector with the standard IDE interface. In this way, the storage device is changed to double interface system and this is an inevitable trend while the external box or the mobile rack currently available in the market is still provided with the IDE interface essentially so that it is hard to comply with the necessity of the preceding double interface system.

SUMMARY OF THE INVENTION

Accordingly, an object of the present invention is to provide a double interface external box for a computer including an upper and a lower lid and a control panel. The upper and a lower lid are oppositely joined to each other and form an external box with a storage device being received and fixed therein. The control panel has a transition circuit board with an outer side thereof being provided with component parts including a first connector with IDE interface, a second connector with USB interface, a cut over switch and a power input end to connect with the transition circuit board by way of a circuit respectively such that signals of the component parts can be transited and with an inner side thereof forming a third connector with IDE interface,sa fourth connector with USB interface and a power output joint. A ribbon wire and/or a USB signal wire can be utilized to connect with an IDE interface connector of the storage device and the third connector and/or a USB interface connector and the fourth connector respectively, a power input socket of the storage device being inserted with the power output joint and the cut cover switch is operated to perform the interface cut over such that the first connector or the second connector can be connected to a connecting port of the computer selectively to enable transmission of signal.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
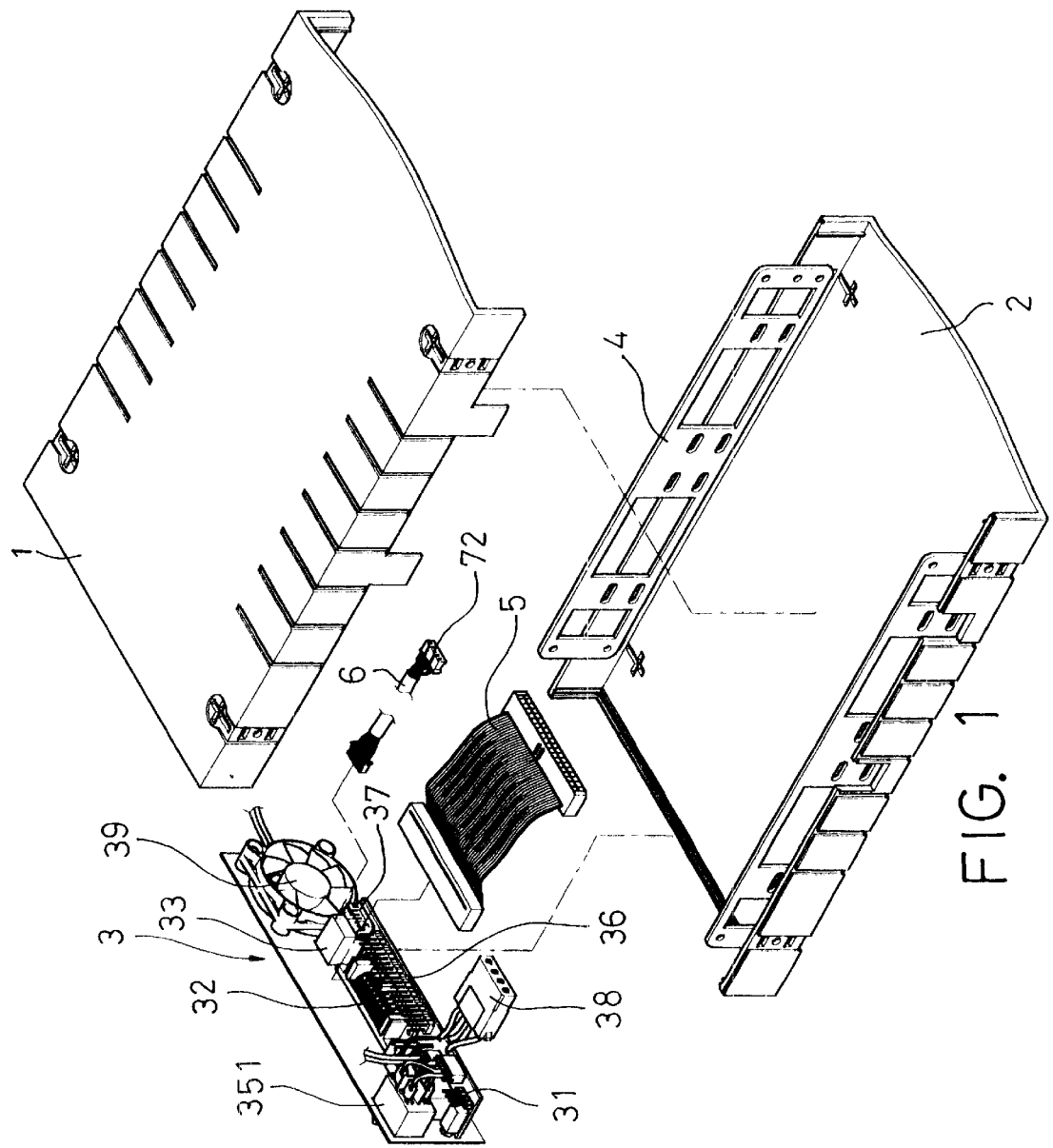
FIG. 1 a disassembled perspective view of a double interface external box according to the present invention.
Figure 2B:
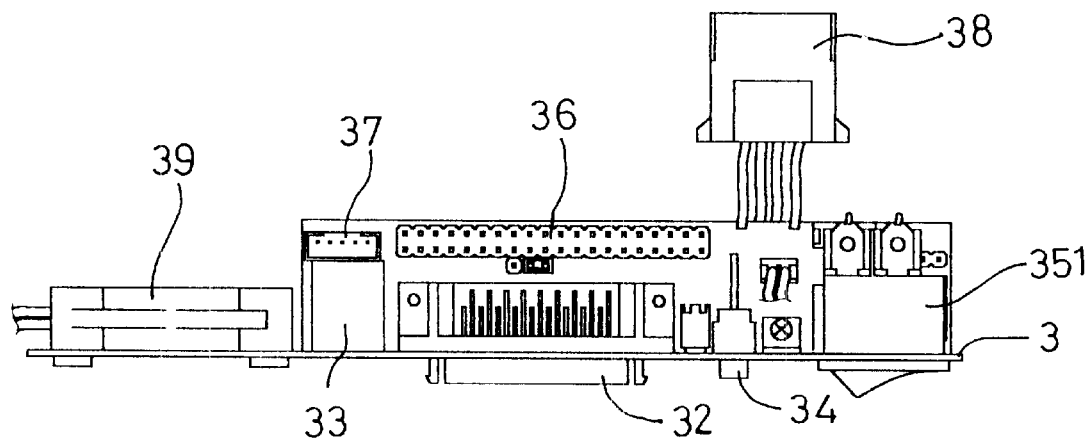
FIGS. 2a and 2b are a front view and a top view of a control panel of the double interface external box for a computer according to the present invention.
Figure 2A:
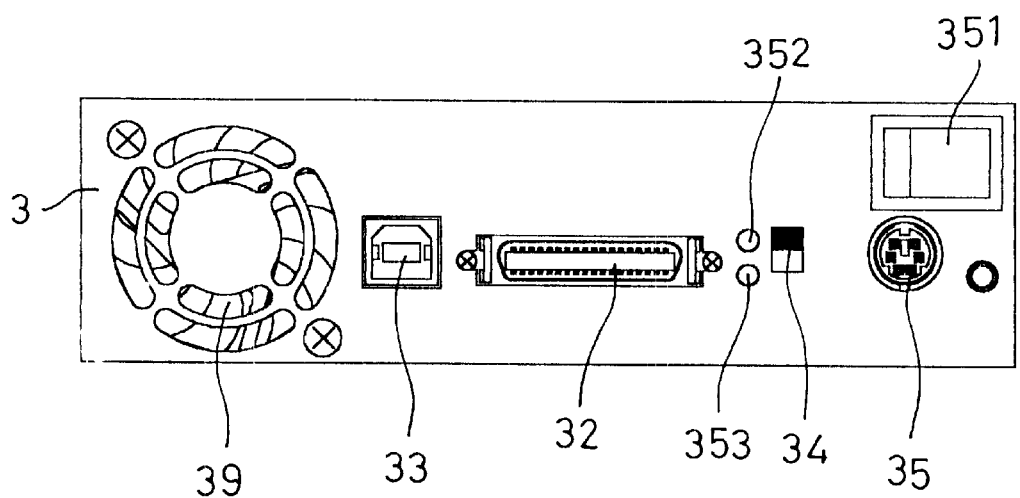
Figure 3:
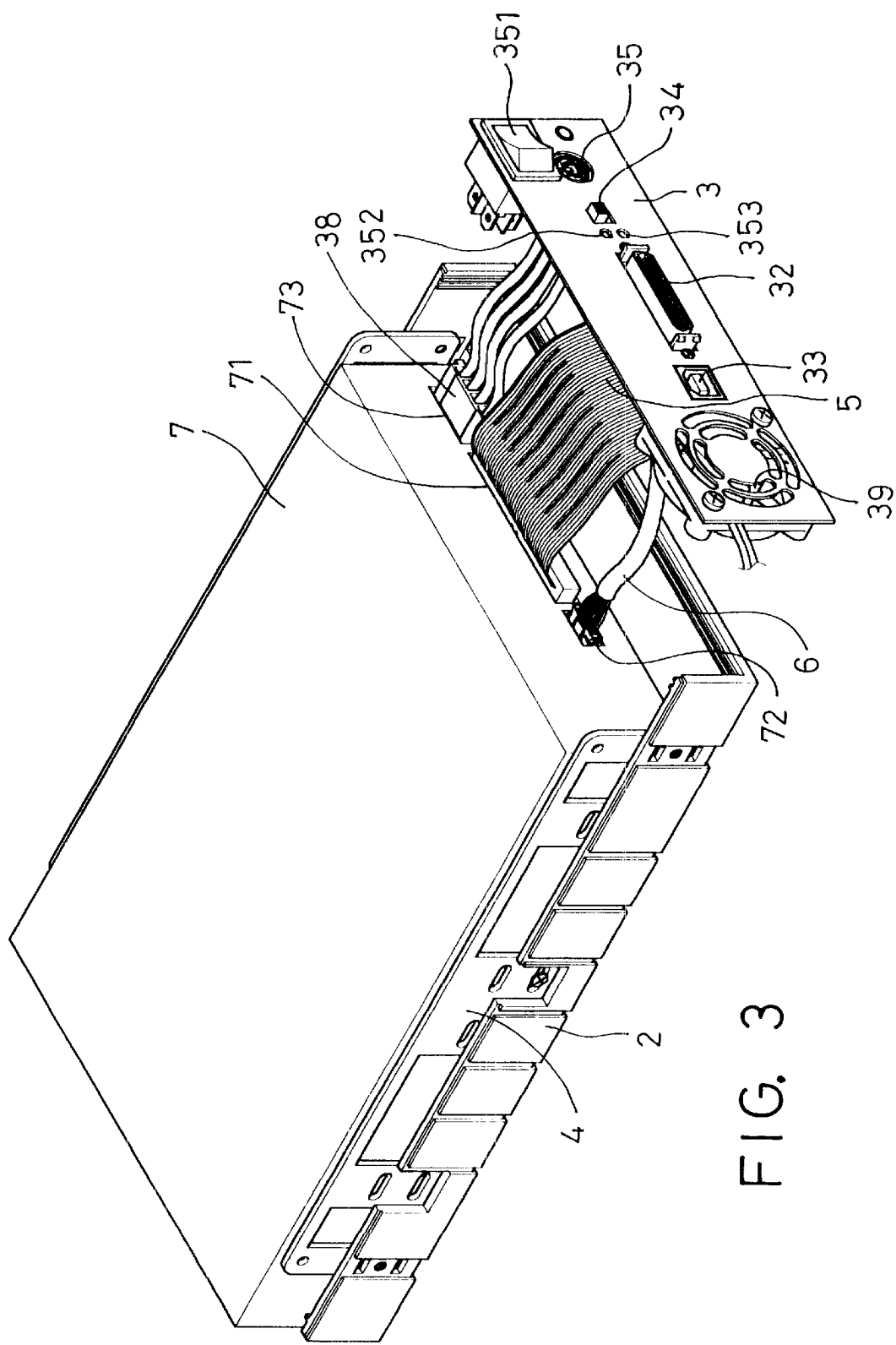
FIG. 3 is a perspective view illustrating the double interface external box being connected to a storage device (compact disk apparatus)

Referring to FIGS. 1 to 3, a double interface external box according to the present invention basically includes an upper lid 1, a lower lid 2 and a control panel 3.

Wherein, the upper lid 1 and the lower lid 2 are conventional covering and the external connection box can be formed once the upper lid 1 and the lower lid 2 are oppositely joined to each other so that a storage device with a size of 5.25 inches, 3.5 inches or 2.5 inches such as a compact disk apparatus or a hard disk apparatus. The upper lid 1 and the lower lid 2 at lateral walls thereof can be joined together firmly with a connecting plate 4 respectively as shown in FIGS. 1 and 3. The storage device such as the compact disk apparatus 7 shown in FIG. 3 or the mobile rack 8 shown in FIG. 4 is disposed between the two connecting plates with screws being used to fasten the storage device and the connecting plates-firmly. In this way, the storage device can be mounted to the external connection box completely. But, it is noted that the storage device being fixed to the external connection box is belonged to the prior and no detail will be described further.

The distinguishing feature of the present invention is in that the external connection box at the rear side thereof is provided with the control panel 3 with a switching circuit board 31 thereon for connecting and fixing parts described hereinafter. Therefore, the control panel 3 at the outer side thereof has the first connector 32 of an IDE interface, the second connector 33 of a USB interface, a cut over switch 34 and a power input end 35. Each of the parts at the outer side of the control panel 3 has wires to connect with the switching circuit board 31. The switching circuit board 31 at the inner side thereof has a third connector 36 with standard 40 pin IDE interface, a fourth connector 37 with USB interface and an output end 38 by way of wire transfer to connect with double interface storage devices such as an IDE interface connector 71, a USB connector 72 and an input socket 73 of the compact disk apparatus 7 via a conventional ribbon wire 5 and a USB signal wire 6 and supplies a necessary working voltage for actuating the compact disk apparatus. Meanwhile, the user can cut over the signal with the cut over switch 34 to select the transmission between the storage device in the external connection box and the computer via either the IDE interface or the USB interface such that it is not possible for the storage device in the external connection box to meet a trouble of incompatible interface.

Wherein, the preceding compact disk apparatus 7 is CD-ROM, DVD-ROM, CD-R, DVD-R, CD-RW or DVD-RW. The first connector of the present invention is MC-36, which is a universal connecting port with IDE interface, and can be connected to a computer quickly with a SMART CABLE, which is developed and nominated by the present inventor. The SMART CABLE is a connecting cable with an end thereof being a MC-36 connector (male) and the other end thereof being a connector (male) with a Wild SCSI interface, a USB interface, a PCMCIA interface, a card us interface or an IEEE1394 interface. Hence, it is very easy to operate the external connection box of the present invention.

Besides, a power switch 351 may be provided between the power input end 35 and the circuit of the transition circuit board 31 to control "ON" and "OFF" of the external power source so as to avoid the trouble of the plug being inserted into or taken out of the input end 35. Further, the control panel 31 at the outer side thereof may have two indicator lights 352, 353 being disposed between the power switch 351 and the circuit of the transition circuit and between the power output joint 38 respectively for showing the power supply status at the external power and the storage device. In addition, a cooling fan 39 can be provided on the control panel 31 to discharge the heat generated from the storage device to the outside.

Figure 4A:
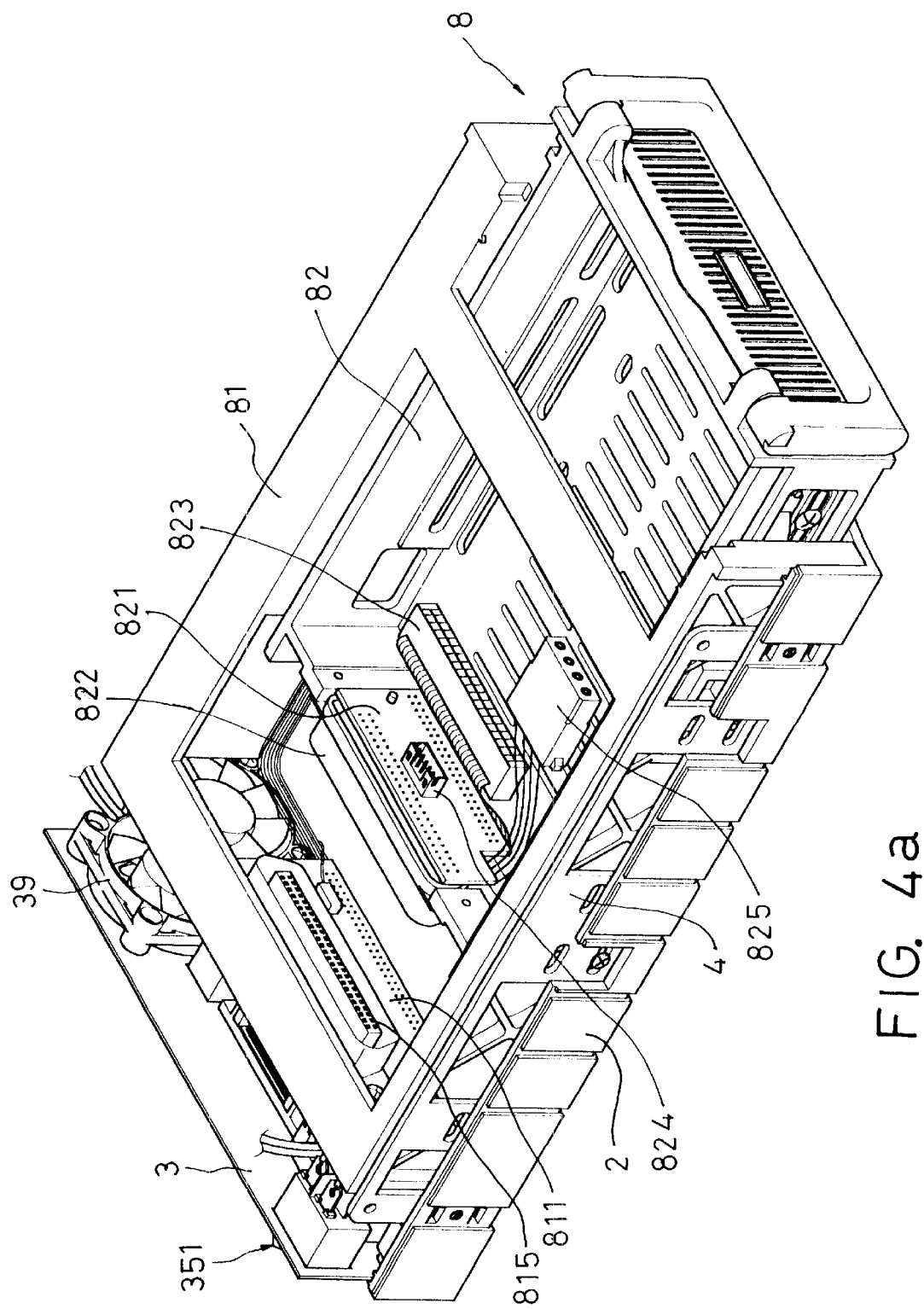
FIGS. 4a and 4b are perspective view illustrating the double interface external box being connected to a storage device (mobile rack).
Figure 4B:
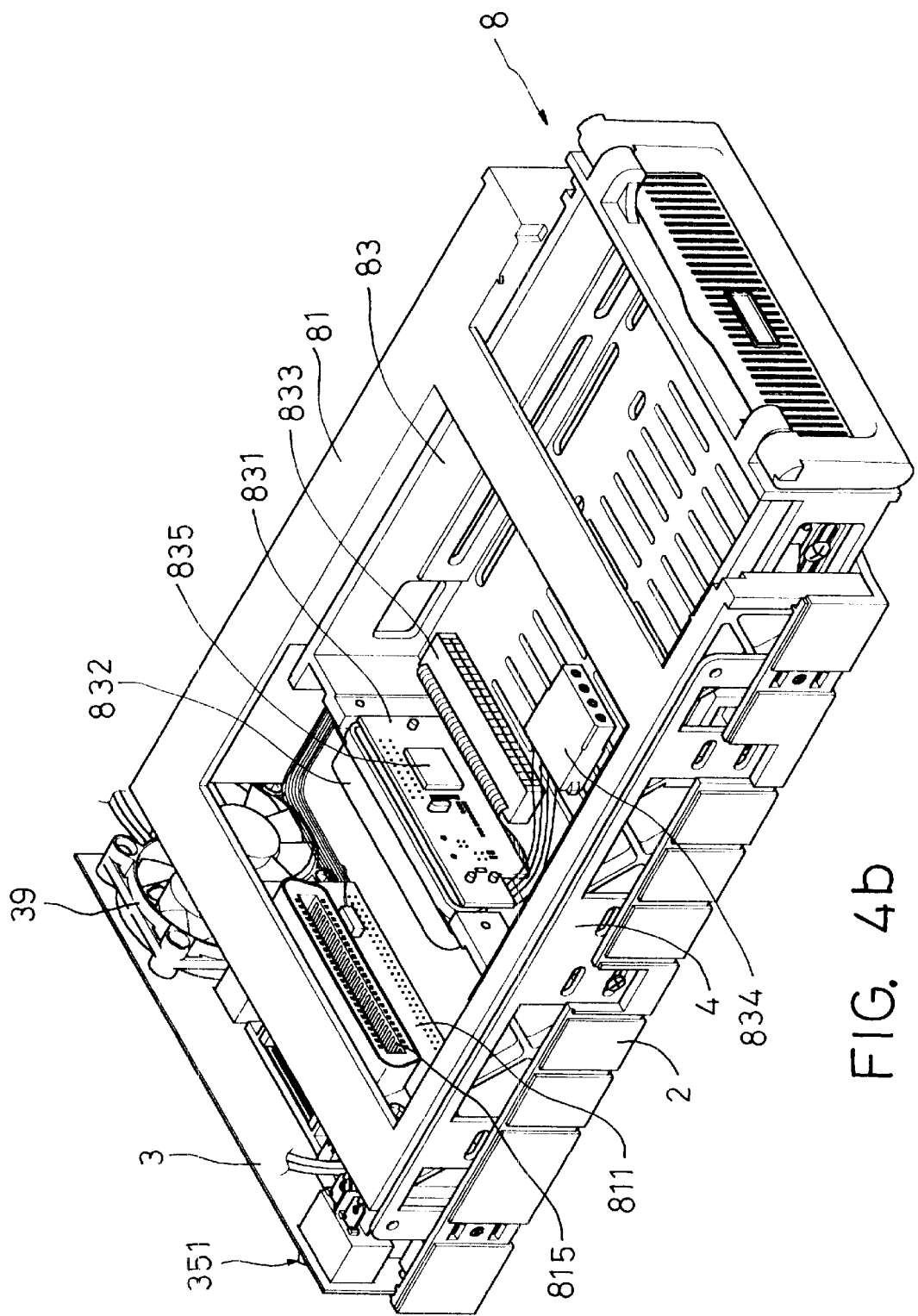

Referring to FIG. 4*a*, the external box also can be assembled with a mobile rack 8 as the foregoing. The mobile rack 8 especially can be a computer mobile rack with IDE interface and USB interface disclosed in U.S. patent application Ser. No. 09/983,374 (corresponding to Taiwan Utility Model Application No. 090215116 and China Utility Model No. 0126124.7). A brief of U.S. patent application Ser. No. 09/983,374 will be mentioned hereinafter. An outer rack 81 of the mobile rack 8 is disposed in and fixedly attached to the external box. The outer rack 81 at the rear side thereof has an outer circuit board 811 with a 40 pin standard IDE interface connector 812, a USB interface connector 813 and a power input socket 814 (not shown in FIG. 4*a* because of the projection angle and please refers to FIG. 3) to connect with the third and fourth connectors 36, 37 via the ribbon wire 5 and the USB signal wire 6. Further, the mobile rack 8 is inserted with the output joint 6 such that all the signals are transferred and joined to the 50 pin outer signal connector 815 at the inner side of the mobile rack 8 such that the outer rack 81 offers a function transmission with an IDE interface and a USB interface and a function of supplying power.

The inner rack 82 at the outer side of the inner circuit board 821 thereof has an inner signal connector 882 and the inner signal connector 882 can engage or disengage the outer signal connector 815 by way of the inner rack 82 being inserted with or detached from the outer rack 81. The inner rack 82 at the inner side thereof divides the signals into a 40 pin standard IDE interface connector 823, a USB interface connector 824 and a power output joint 825 so as to connect with a IDE interface storage device such as a hard disk, a ZIP floppy disk, a MO, a magnetic tape machine or a flash memory card reader or a USB periphery such as a hub, a net card, a TV tuner, a modem or a flash memory card. Thus, the external box of the present invention associated with the mobile rack 8 is in use, the cut over switch 34 can be cut over based on what interface of the device in the inner rack 82 is and then the computer forms a circuit and connects with the signal. Hence, the use of the external box of the present invention can be expanded to a broader extent.

Besides, an inner rack of a computer mobile rack device disclosed in U.S. patent application Ser. No. 10/147,876 (corresponding to Taiwan Utility Model Application No. 091204727 and China Utility Model Application No. 02231526.8) can be used instead of the preceding inner rack. Wherein, the inner rack 83 at the inner circuit board 831 has a control IC 835 (same as the preceding ASIC), which can convert the IDE interface signal to the USB interface signal. The inner rack 83 at the outer side thereof has an inner rack signal connector 832 for being engaged to or disengaged from the preceding outer signal connector 815 and at the inner side thereof only separates a 40 pin standard IDE interface connector 833 and a power output plug 834 to connect with an IDE interface storage device such as a hard disk, a ZIP floppy disk, a MO, a magnetic tape or a flash memory card reader, respectively. Hence, the IDE interface signal of the storage device can be converted to USB signal via the control IC and the USB signal is transmitted to the fourth connector 37 of the transition circuit board 31 via the inner and the outer signal connector 832,815 and the USB signal wire 6. Meanwhile, the cut over switch 34 is stirred to the USB interface such that the signal can pass through the second connector 33 to connect with the USB port of the computer. If the power switch 351 is under control of ON/OFF, the IDE interface storage device can offer functions of plug & play and hot swapping.

It is appreciated from the preceding detailed description that the double interface external connection box of the present invention being fixedly connected to any type of storage device such as a compact disk apparatus or a mobile rack is not possible to occur inconsistent interfaces in addition to complying with single or double interface storage device. Further, it is possible for the user to select a double interface inner rack or an inner rack capable of converting the IDE interface signal to the USB interface depending on the inner rack and the interface in the inner rack in case of the external connection box fixedly connecting with the outer rack of the double interface mobile rack such that the external connection box can be expanded the extent of use thereof. Furthermore, the first connector of the present invention is MC-36 and it is possible to be joined to the computer quickly by way of the other end of the connecting cable being replaced with different interfaces so that the external connection box of the present invention can be operated easily.

While the invention has been described with reference to a preferred embodiment thereof, it is to be understood that modifications or variations may be easily made without departing from the spirit of this invention, which is defined by the appended claims.

What is claimed is:

1. A double interface external box for a computer, comprising
   an upper and a lower lid, being oppositely joined to each other and forming an external box with a storage device being received and fixed therein; and
   a control panel, having a transition circuit board with an outer side thereof being provided with component parts including a first connector with IDE interface, a second connector with USB interface, a cut over switch and a power input end connecting with the transition circuit board by way of a circuit so that signals of the component parts are transmitted and with an inner side thereof forming a third connector with IDE interface, a fourth connector with USB interface and a power output joint;

whereby, a ribbon wire and a USB signal wire are utilized to connect an IDE interface connector of the storage device with the third connector and a USB interface connector with the fourth connector respectively, a power input socket of the storage device being inserted with the power output joint and the cut over switch is operated to perform the interface cut over such that the first connector or the second connector can be connected to a connecting port of the computer selectively to form signal transmission.

2. The double interface external box for a computer as defined in claim 1, wherein a power switch is arranged at a circuit between the power input end and the transition circuit board.

3. The double interface external box for a computer as defined in claim 1, wherein two indicator lights are disposed between the power switch and the circuit of the transition circuit board and between power switch and the power input end respectively.

4. The double interface external box for a computer as defined in claim 1, wherein the control panel is provided with a cooling fan.

5. The double interface external box for a computer as defined in claim 1, wherein the first connector is a MC-36 connector.

6. The double interface external box for a computer as defined in claim 1, wherein the storage device is a compact disk apparatus.

7. The double interface external box for a computer as defined in claim 6, wherein the compact disk apparatus is CD-ROM, DVD-ROM, CD-R, DVD-R, CD-RW OR DVD-RW.

8. The double interface external box for a computer as defined in claim 1, wherein the storage device is a mobile rack with an outer rack thereof having on outer circuit board, an IDE interface connector a USB interface connector and a power input socket connecting with the third and the fourth connectors and the power output joint respectively, such that all the signals are transferred and joined to an outer signal connector at the inner side of the outer rack so as to provide an IDE interface signal, a USB interface signal and power;

an inner rack thereof having an inner circuit board with an outer side thereof providing an inner signal connector corresponding to the outer signal connector for engaging with or disengaging from each other and an inner side thereof providing an IDE interface connector, a USB interface connector and a power output joint respectively being selectively connected to an IDE interface storage device or USB interface periphery;

whereby, the cut over switch is adjusted to interface with an IDE interface device or USB interface peripheral disposed in the inner rack and the first or the second connector can be connected to a connecting port of the computer to enable transmission of the signal.

9. The double interface external box for a computer as defined in claim 8, wherein the IDE interface storage device is a hard disk, a ZIP floppy disk, a MO, a magnetic tape or a flash memory card reader.

10. The double interface external box for a computer as defined in claim 8, wherein the USB interface periphery is a hub, a net card, a TV tuner, a modem or a flash memory card.

11. The double interface external box for a computer as defined in claim 1, wherein the storage device is a mobile rack with an outer rack thereof having an outer circuit board, an IDE interface connector, a USB interface connector and a power input socket connecting with the third and the fourth connectors and the output joint such that all the signals are transferred and joined to an outer signal connector at the inner side of the mobile rack so as to provide an IDE interface signal, a USB interface signal and power;

an inner rack thereof having on inner circuit board with an outer side thereof providing an inner signal connector corresponding to the outer signal connector for engaging with or disengaging from each other and the inner circuit board having a control IC for transferring an IDE interface signal to a USB interface signal with an inner side thereof providing an IDE interface connector and a power output joint respectively being connected to an IDE interface storage device;

whereby, the IDE interface of the IDE interface storage is converted to the USB interface signal with the cut over switch being adjusted to a status of USB interface and the second connector can be connected to a USB port of the computer to enable transmission of the signal.

12. The double interface external box for a computer as defined in claim 11, wherein the IDE interface storage device is a hard drive, a ZIP floppy disk, a MO, a magnetic tape or a flash memory card reader.

* * * * *